Sept. 4, 1956  G. H. BILLUE  2,761,511
TREATMENT OF EARTH FORMATIONS
Filed March 23, 1953
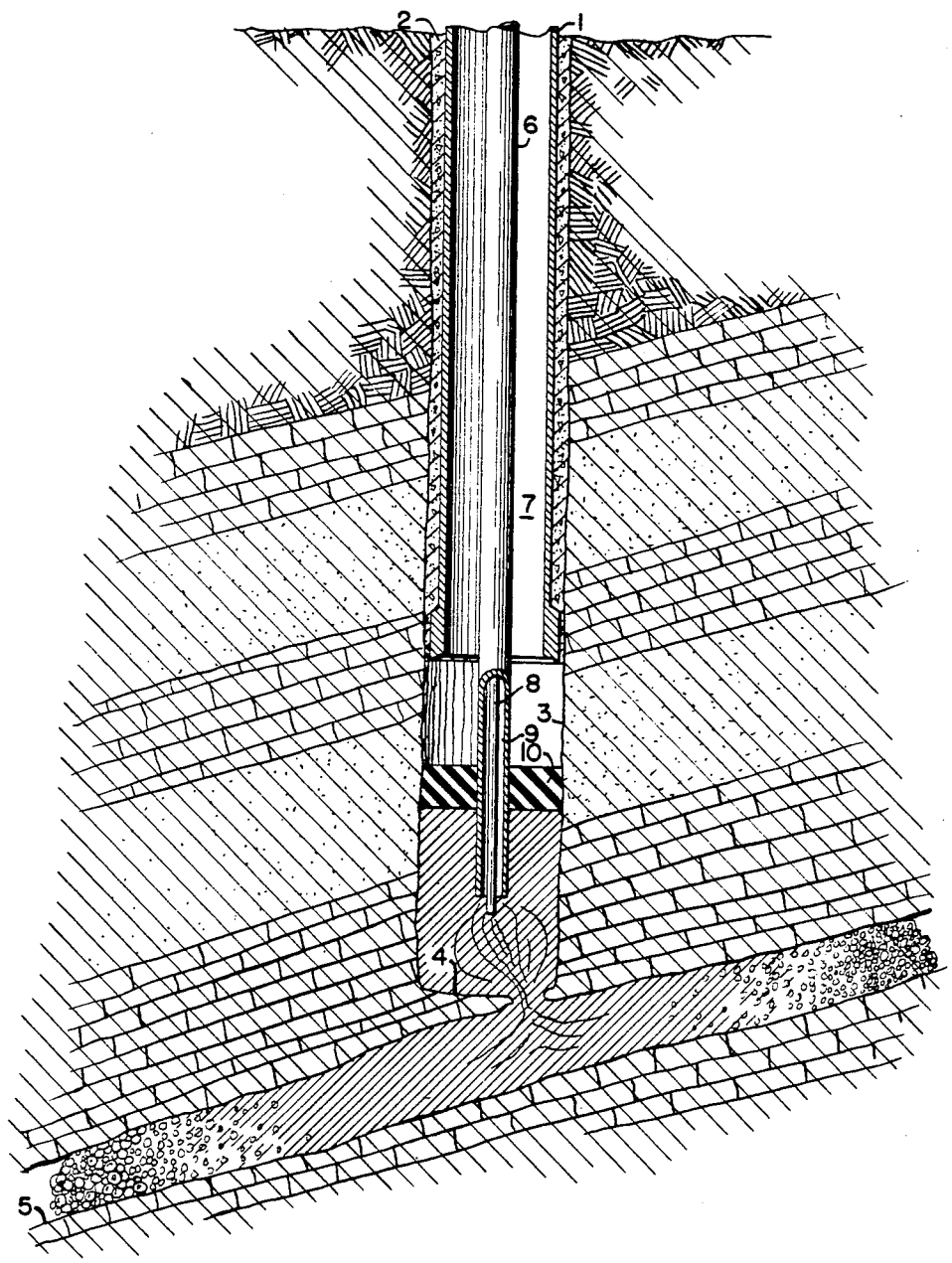
G. H. BILLUE
*INVENTOR.*
BY *Herbert J. Brown*
ATTORNEY

United States Patent Office 2,761,511
Patented Sept. 4, 1956

2,761,511
TREATMENT OF EARTH FORMATIONS
Gaines H. Billue, Wichita Falls, Tex.

Application March 23, 1953, Serial No. 344,029

5 Claims. (Cl. 166—29)

This invention relates to a method of treating earth formations to seal openings encountered when drilling wells.

In drilling oil wells, various earth formations are encountered as drilling progresses and many of these formations have openings in them ranging from small holes and cracks to large fissures and the like. Rotary drilling operations depend on a continuous circulation of drilling fluid from the earth's surface to the bottom of the well bore and back to the surface of the earth. When openings in the formations are encountered, drilling fluid flows into them and, in many cases, circulation stops, so that it is necessary to seal the openings. Various methods are in use for sealing openings, but present methods do not satisfactorily cope with the large fissures or the like. Openings are sometimes found that are so large or extend so far that tons of cement can be pumped into them without sealing them, and even when the large openings can be sealed eventually, considerable quantities of cement or other composition are required.

It is therefore an object of this invention to provide a method for sealing openings, porous strata, etc., in earth formations, and particularly to provide a method for sealing such openings when the same are encountered during the drilling of wells.

A particular object is to provide a method for sealing openings in earth formations wherein the openings are filled rapidly from top to bottom with material which will form an impermeable barrier without filling the entire volume of such openings.

An additional object is to utilize the expanding nature of a gas formed near or in an opening to propel a sealing composition into the opening rapidly and at the same time, cause it to build up completely across an opening in the formation.

These and other objects of the invention will be apparent on consideration of the following description and on reference to the accompanying drawing.

Broadly stated, my invention comprises a method of sealing a natural opening in an earth formation encountered when drilling a well, which includes the steps of introducing a substantially bubble-free solidifiable sealing material in a liquid state through the well bore into the opening, forming a mass of gas-filled bubbles in the liquid sealing material while in the opening, and subsequently allowing the solidifiable sealing material to harden within the opening.

In the method of this invention, a gas and a substance capable of forming bubbles or foam are provided in a well bore in the zone of an earth opening or porous formation. The gas and the bubble-forming substance are preferably maintained separate until they are present at the zone of the opening, and the gas, or substances which will produce a gas, is introduced at the same time as or subsequent to the bubble-forming substance. The bubble-forming substance is preferably quick-hardening, and it and the gas, or at least one of a combination of substances which will produce a gas, are preferably introduced separately. By the term gas is meant a substance which is a gas under the conditions of temperature and pressure existing in the zone of the earth fault.

When a substance capable of forming bubbles or foam is introduced into an opening adjacent the well bore and a gas is produced within the mass or is otherwise mixed with it, bubbles form and, when the well bore is closed or under pressure from the earth's surface, they quickly build up across the opening. In a matter of minutes, sizeable volumes of bubbles are present in the opening, and the mass of bubbles provides continually increasing resistance to flow, until a point is reached where flow through the opening is prevented or substantially prevented. The opening is then full of bubbles, for substantial distances from the well bore. If necessary, the formation around the well bore is cemented, and which operation is carried out by using the bubbles present to prevent the cement from flowing further into the fissure or opening. After a suitable setting time, depending upon the substances employed, drilling operations are resumed.

Suitable bubble-forming substances are those which form bubbles or foam that provide substantial resistance to flow within a reasonable length of time. Excluded are substances which set to a rigid mass nearly immediately, as they will not provide a wall of bubbles thick enough to resist the pressures employed. Numerous substances are available which may be used in the process of this invention, and the invention is not limited to any particular substance or combination of substances. A preferred bubble or foam-forming substance, the components of which are readily available in the oil fields, is a composition including water Portland cement and plaster of Paris $(CaSO_4)_2.H_2O$. The cement and plaster of Paris are mixed in proportions of about 1 to 10 parts by weight of cement to one part by weight of plaster of Paris, with 10 parts of cement to one part of plaster of Paris being preferred. About 10 gallons of water are mixed with each cubic foot of cement and plaster of Paris mixture. Since this mixture sets rapidly, the cement and plaster of Paris are preferably kept separate until they reach the well bottom, each being introduced in admixture with part of the water required. A gas is then introduced, as stated in the foregoing, for creating the bubbles which quickly set the mixture and form a sealing wall in the formation opening.

The gas for producing the bubbles is preferably liberated in the opening or porous formation, advantageously within the mass of bubble-forming substance. Subsequent to or at the same time as cement slurry is introduced in the opening or porous formation, two or more substances which will react to produce a gas are separately introduced so that they contact each other and react in the opening. An acid, preferably inorganic, and a metal above hydrogen in the electromotive series, preferably iron, zinc, aluminum, or magnesium, may be introduced separately and will react to produce hydrogen which will form bubbles or foam with the cement slurry and will expand the mass in the earth fault. When the acid contacts a limestone formation, additional gas will be produced and will cooperate in the process. The metal may be incorporated in the cement slurry, and the acid is introduced separately from the metal, causing part of the reaction to take place within the slurry. Carbonates or bicarbonates may be introduced in solution, suspension, or mixed with the cement slurry, and the acid again added separately, to produce carbon dioxide. Similarly, other methods for providing a gas in the well bore may be employed.

The quantity of gas necessary will vary with the bubble-forming substance employed, and the amount of gas which will escape into the earth formation cannot be foretold. Consequently, the gas requirements cannot be predicted accurately. An estimate of the gas requirement can be obtained by carrying out a pilot operation at the earth's surface, simulating well bore conditions in a suitable vessel. The volume of gas per unit of bubble-forming substance that is required to convert the bulk of the latter to bubbles is noted, and a large excess of gas is provided in the well bore.

Numerous resins and resinous substances are included in the group of bubble or foam-producing substances which may be utilized in the method of this invention. For example, in U. S. Patent No. 2,527,581, there are described phenol-resorcinol-formaldehyde and like resins which are suitable, the reactants being varied to produce the results desired, and may include the introduction of a gas as referred to in the foregoing. In operation, a mixture of the resin-producing reactants including excess alkali is introduced into the well bore, and finely divided aluminum or silicon is separately introduced at the same time. Reaction commences on contact, and resin bubbles form in the earth fault, where they gel and seal the openings. Alternatively, the alkali may be added separately, and the metal may be incorporated in the resin-forming mixture. Similarly, other polymerizable compounds and mixtures capable of forming bubbles or foam are used, such as phenolic-aldehyde and phenolic-furfural resins, polystyrene, vinyl compounds, polyesters, polyamides, and the like. Preferred are those resinous substances which are thermosetting. The alkaline or acidic catalyst used as an accelerator may be increased in amount to provide for gas production, in a manner as previously described. The resinous bubbles are particularly adapted for sealing porous formations having small openings, and at the same time, will fill large fissures and the like, which would otherwise require considerable quantities of cement or other solidifiable material introduced by prior methods.

Operation according to the above-described method may be visualized upon reference to the accompanying drawing which is a diagrammatic representation of a cross-section of a well, in elevation, showing one form of apparatus suitable for carrying out the method of this invention. In the drawing, a casing 1 set in cement 2 is in position in a well bore 3, terminating short of the base 4 of the bore. The base 4 communicates with a fissure or fault 5 in the earth formation adjacent the bore. A tubing 6 is suspended within the casing 1, forming an annulus 7 therebetween, and a second tubing 8 is suspended within the tubing 6 and forming a second annulus 9 with it. The bottom of the bore 3 is sealed off by a packer 10, which fits tightly around the tubing 6 and against the wall of the bore. The bottom of the bore 3 and part of the fissure 5 are shown as filled with sealing composition part of which has been formed into bubbles or foam.

During drilling, when a fault such as 5 is encountered which results in the loss of circulation, the drill pipe and cutters are removed from the well and the tubes 6 and 8 and the packing 10 are inserted. The tube 6 is connected to a supply of bubble-forming substance, such as a cement slurry or resinous fluid as described above, which contains a substance designed to produce gas on reaction, such as a metal, an acid or an alkali; and the tube 8 is connected to a supply of another material for effecting the gas-producing reaction, such as a metal, an acid or an alkali. The two compositions are pumped into the well bore so that they reach the bottom preferably about the same time, one composition flowing out of the annulus 9 and the other out of the interior of tube 8. As the compositions flow into the fissure 5, they mix and bubbles are produced which build up rapidly in the fissure 5, filling it, until resistance to flow builds up due to a combination of adherence and stiffness of bubbles and the resistance afforded by the large quantity of bubbles present in the fissure. Flow subsequently ceases, and on the resulting increase in pressure, pumping of fluids is stopped and the tubes 6 and 8 and the packer 10 are withdrawn from the well. After waiting a period of time for the sealing composition to set sufficiently, or after further cementing the formation around the well bore, drilling operations are resumed. Other arrangements for introducing the several substances may be used, and the manner of introduction may be varied. For example, the tube 8 and the packer 10 may be eliminated and one composition then pumped through the annulus 7, or the substances may be introduced in several streams where it is desired to separate both of the gas-producing substances from that forming the bubbles.

The invention is not limited to the specific embodiments described and shown, but various changes and modifications may be made within the scope of the appended claims.

I claim:

1. The method of sealing a natural opening in an earth formation encountered when drilling a well, the steps of introducing a substantially bubble-free solidifiable sealing material while in a liquid state through the well bore into said opening, forming a mass of gas-filled bubbles in said liquid sealing material while in said opening by introducing gas producing substances into the formation before the material has hardened, and subsequently allowing said solidifiable sealing material to harden within said opening.

2. The method of sealing a natural opening in an earth formation encountered when drilling a well, the steps of introducing a substantially bubble-free solidifiable sealing material while in a liquid state through the well bore into said opening, mixing a gas with said sealing material while still in a liquid state and forming a mass of gas-filled bubbles therein while in said opening, by introducing gas producing substances into the formation before the material has hardened and subsequently allowing said solidifiable sealing material to harden within said opening.

3. The method as set forth in claim 1, wherein the sealing material includes Portland cement.

4. The method as set forth in claim 1, wherein the sealing material comprises a synthetic resin.

5. The method as set forth in claim 1, wherein gas is introduced into the sealing material to form bubbles therein, by means of a chemical reaction in situ.

References Cited in the file of this patent

UNITED STATES PATENTS

| Number | Name | Date |
|---|---|---|
| 159,805 | Dobbs | Feb. 16, 1875 |
| 1,087,098 | Aylsworth et al. | Feb. 17, 1914 |
| 1,452,463 | Huber | Apr. 17, 1923 |
| 1,519,311 | Johnson | Dec. 16, 1924 |
| 2,190,989 | Johnston | Feb. 20, 1940 |
| 2,236,987 | Bechtold | Apr. 1, 1941 |
| 2,240,622 | Lawson | May 6, 1941 |
| 2,288,557 | Vollmer | June 30, 1942 |
| 2,352,468 | Burnam | June 27, 1944 |
| 2,409,910 | Stober | Oct. 22, 1946 |
| 2,434,605 | Wrightsman | Jan. 13, 1948 |
| 2,527,581 | Searer et al. | Oct. 31, 1950 |
| 2,612,954 | Hamilton | Oct. 7, 1952 |
| 2,653,139 | Sterling | Sept. 22, 1953 |